June 13, 1961 N. S. PRYWES 2,988,730
MAGNETIC MEMORY WITH NON-DESTRUCTIVE READ-OUT
Filed Sept. 30, 1955 4 Sheets-Sheet 1

INVENTOR.
Noah S. Prywes
BY Morris Rabkin
ATTORNEY.

INVENTOR.
Noah S. Prywes
BY
Morris Rabkin
ATTORNEY

INVENTOR.
Noah S. Prywes
BY Morris Rabkin
ATTORNEY.

June 13, 1961 N. S. PRYWES 2,988,730

MAGNETIC MEMORY WITH NON-DESTRUCTIVE READ-OUT

Filed Sept. 30, 1955

4 Sheets-Sheet 4

INVENTOR.
Noah S. Prywes
BY
Morris Rabkin
ATTORNEY.

2,988,730

MAGNETIC MEMORY WITH NON-DESTRUCTIVE READ-OUT

Noah S. Prywes, Pennsauken, N.J., assignor to Radio Corporation of America, a corporation of Delaware Filed Sept. 30, 1955, Ser. No. 537,771
10 Claims. (Cl. 340—174)

Figure 1:
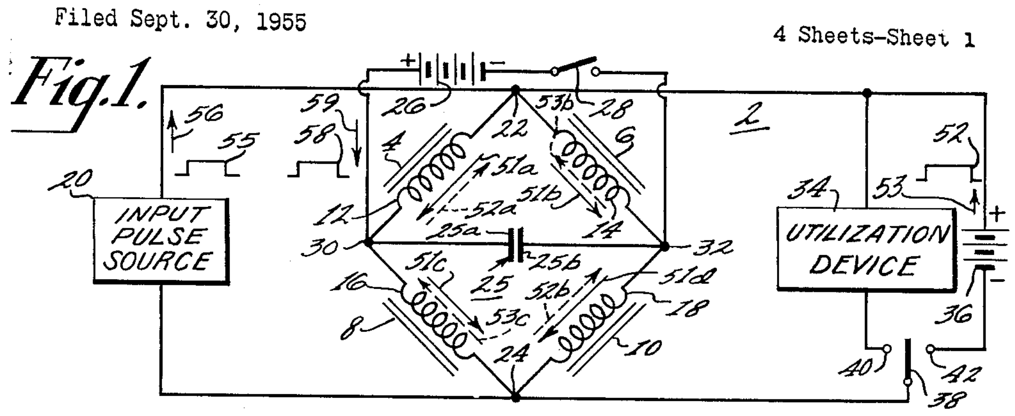

This invention relates to magnetic systems, and particularly to improved means for controlling electrical signals by means of such systems.

Static magnetic systems which have a memory attribute so that control can be effected by a single electrical impulse instead of a continuous signal are known. In some known magnetic core storage circuits, the read-out of the stored information is a destructive process. That is, the read-out is achieved by means of a standard signal of one polarity which always leaves the core magnetized in a certain one direction. When it is desired to retain the stored information, additional feedback circuitry is required for returning the information back to the storage circuit. This destructive read-out presents additional problems when such storage circuits are included in larger, more complex logical units. A non-destructive read-out magnetic system is also known in which the storage of the information read-out is not destroyed when the system is interrogated.

It is one object of the present invention to provide a static magnetic memory system different from such systems heretofore known, in which a single electrical impulse is effective in controlling the switching of electrical signals for any desired time.

Another object of the present invention is to provide an improved magnetic system of the type generally useful in information handling systems for performing information storing and transfer functions.

Still another object of the present invention is to provide an improved magnetic storage device of the kind from which stored information can be repeatedly read-out without requiring additional feedback circuitry.

Yet another object of the present invention is to provide an improved magnetic device for transferring information of the kind wherein separate control signals can be applied at different times for effecting the information transfer.

A further object of the present invention is to provide an improved magnetic device which can be arranged in complex logical circuits in a relatively simple and straightforward manner.

According to the invention, a magnetic system includes at least two magnetic cores having "appreciable remanence" and having four windings thereon interconnected in a bridge circuit, and this system has a temporary storage device, such as a capacitor, connected across one of the diagonals of the bridge circuit. By "appreciable remanence" is meant the ratio between the remanent flux and the saturation flux in a core is relatively large, say 0.6 or greater.

This magnetic system or device has different response conditions to signals applied across the second diagonal. In one response condition the circuit offers a high impedance to the applied signals, and in another response condition the circuit offers a relatively low impedance to the applied signals. Internally, the one response condition arises when the cores are magnetized in different directions of magnetization; the other response condition arises when the two cores are each magnetized in the same direction. The cores may be set in desired directions by applying a suitable pulse across the one or the other of the bridge circuit diagonals. Alternatively, the cores may be set in desired directions by applying suitable pulses to additional windings linked to the cores. Once a desired response condition is established, an indefinite number of input signals can be applied without changing the bridge circuit to its other response condition.

A number of embodiments of the present invention are described hereinafter. In some embodiments only two cores are used; other embodiments have four cores. The output may be taken by way of a device connected in parallel or in series with the bridge circuit or by way of separate windings linked to the cores. Further, according to the invention, one or more of these magnetic devices may be advantageously arranged to form logical systems for handling encoded data such as, for example, "and" gate units, storage register devices, binary counters, and binary adders.

Figures 1A, 1B, 1C:
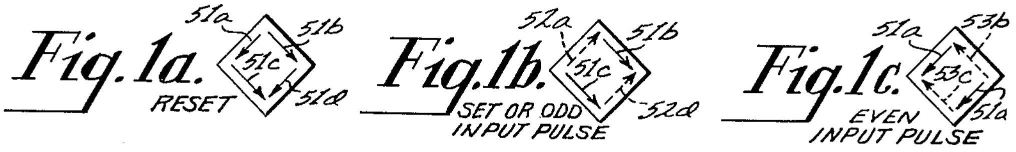
Figure 3:
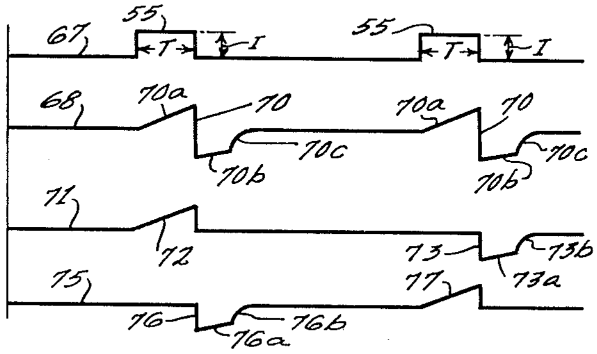
Figure 2:
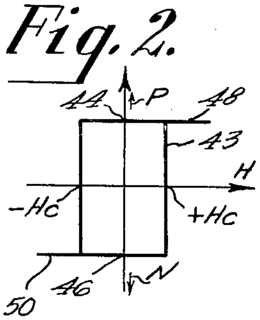
Figure 4:
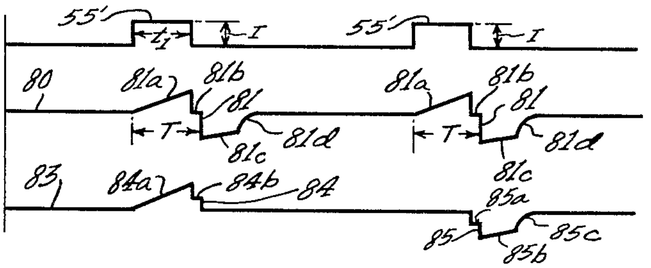
Figure 5:
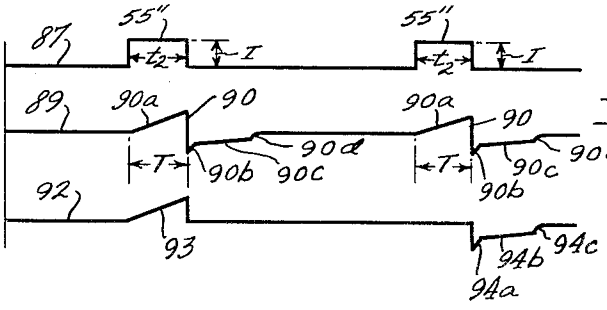
Figure 6:
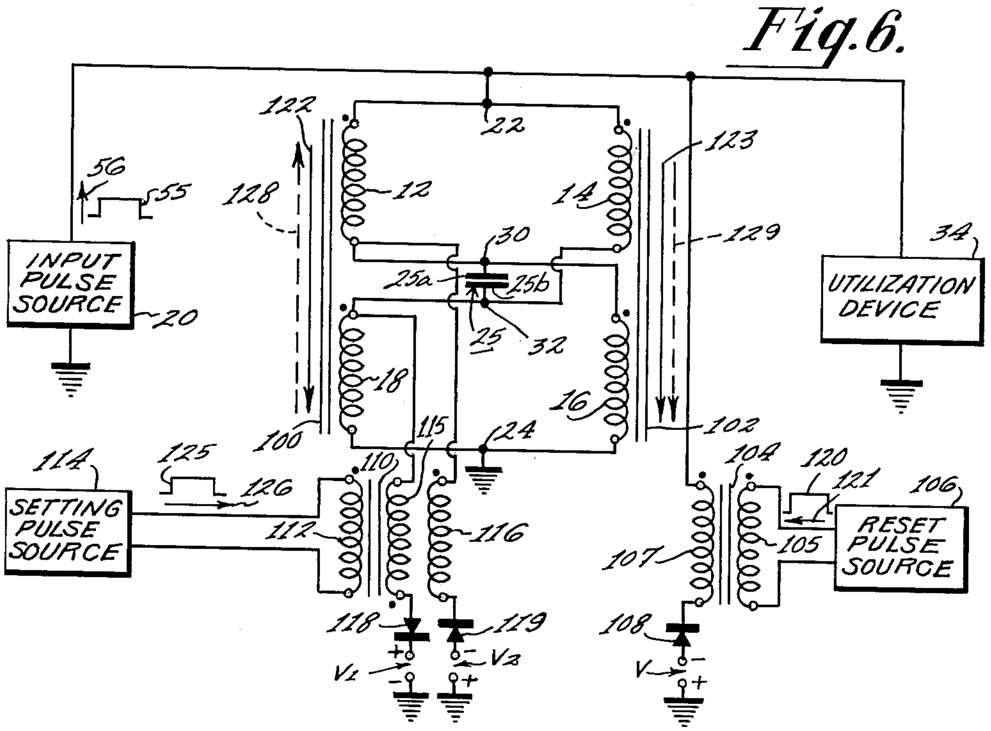
Figure 7:
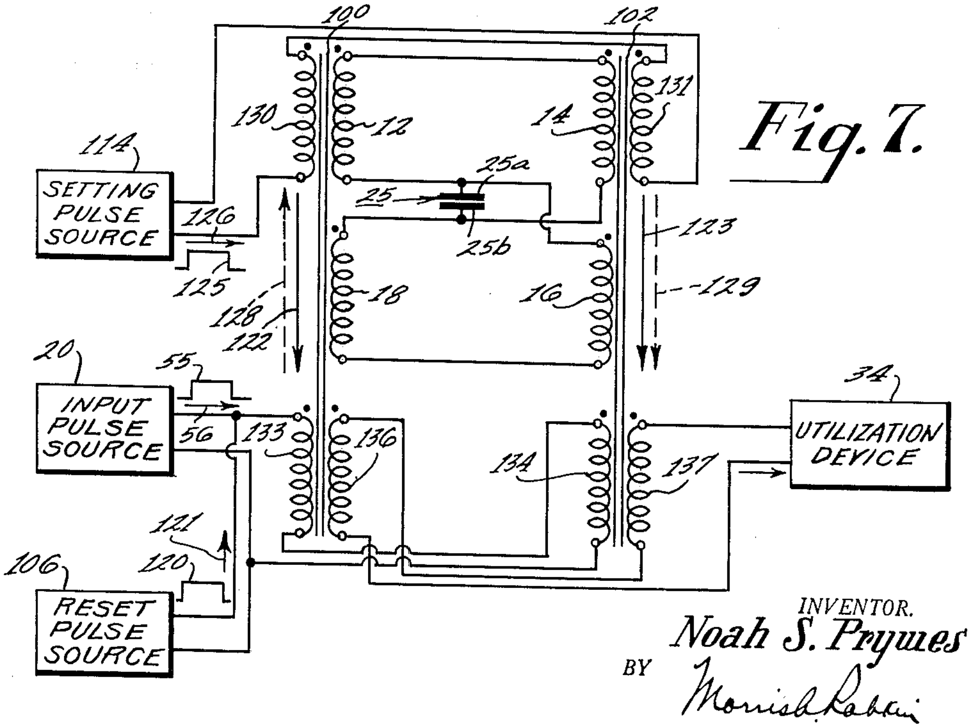

The novel features of the invention, as well as the invention itself, will best be understood from the following description, when read in connection with the accompanying drawing, wherein like reference numerals refer to like parts, and in which;

FIG. 1 is a schematic diagram of a magnetic system according to the invention employing four separate cores, FIGS. 1*a*, 1*b* and 1*c* are symbolic diagrams illustrating, by arrows, the impedance condition of the various bridge arms of the system of FIG. 1 at selected times during the system operation, FIG. 2 is a curve of a hysteresis characteristic, somewhat idealized, useful in explaining the operation of the magnetic systems of the present invention, FIGS. 3, 4 and 5 are representative graphs of voltage waveforms in various parts of the system of FIG. 1 for varying duration input signals, FIG. 6 is a schematic diagram of a magnetic system according to the invention employing two separate cores, FIG. 7 is a schematic diagram illustrating a modified form of the system of FIG. 6.

Figure 8:
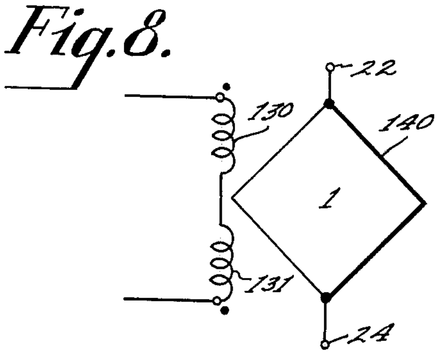
Figure 9:
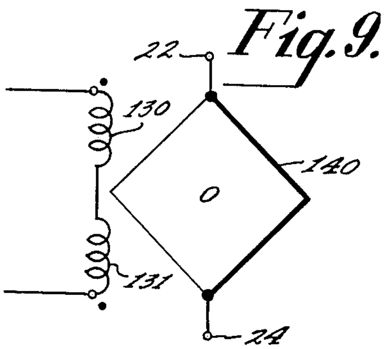
Figure 10:
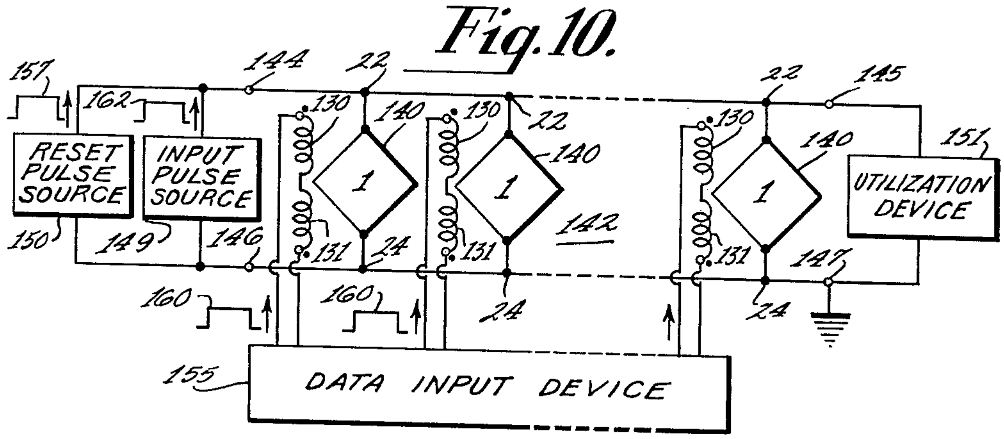
Figure 11:
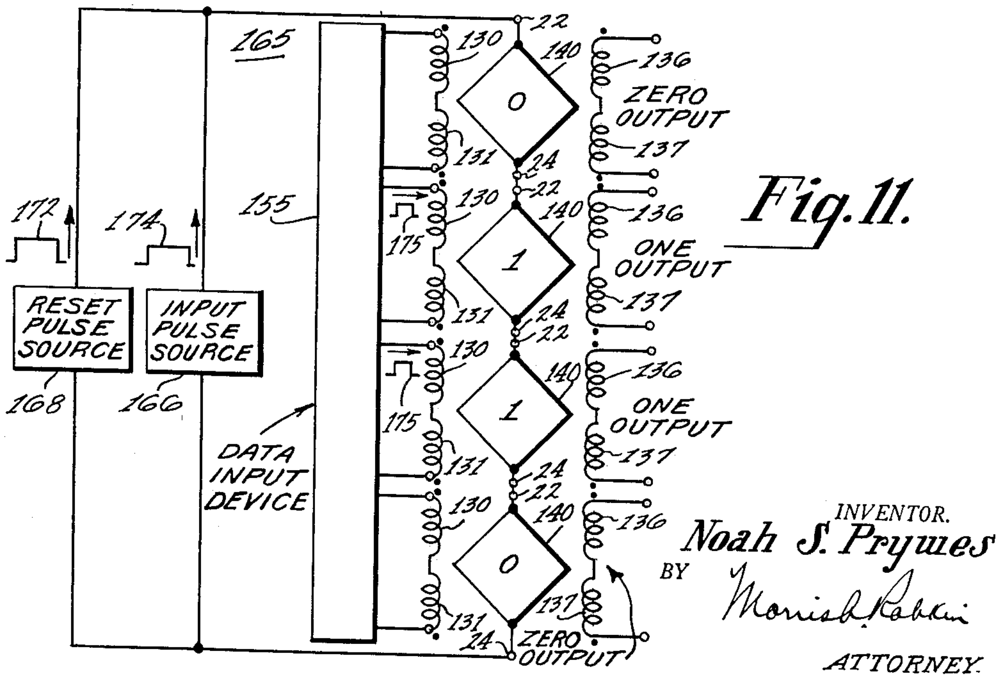
Figure 12:
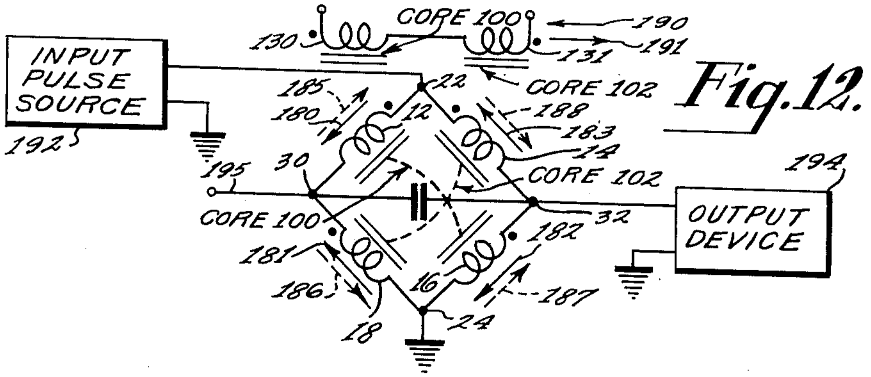
Figure 13:
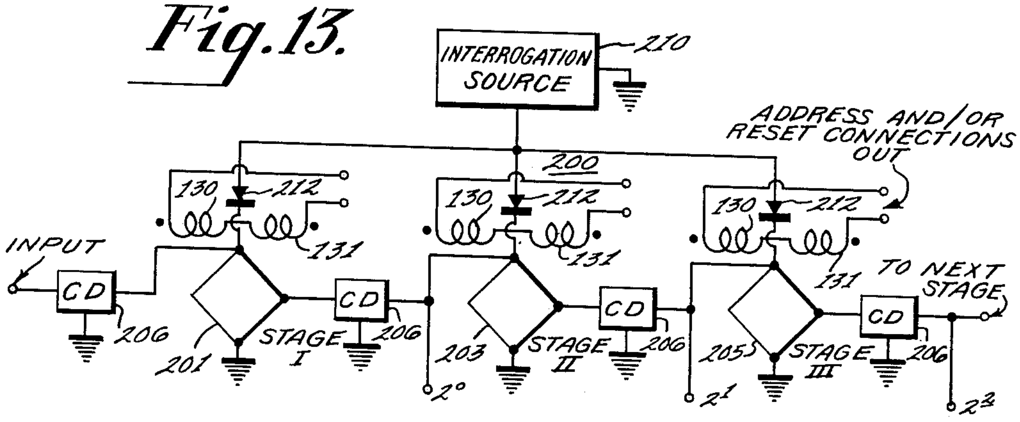
Figure 14:
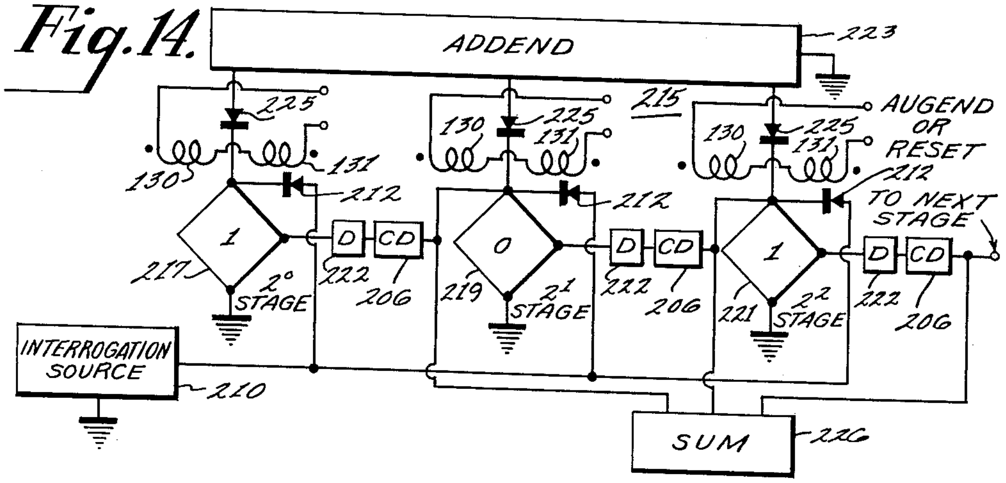
Figure 15:
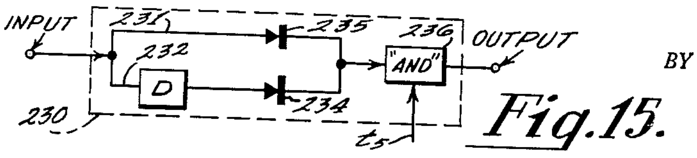

FIGS. 8 and 9 are symbolic representations respectively of the two response conditions of the system of the present invention, FIG. 10 is a schematic diagram, utilizing the symbolic representations of FIG. 8, and illustrating one manner of interconnecting a plurality of systems to form an "and" gate circuit, FIG. 11 is a schematic diagram, utilizing the symbolic representations of FIGS. 8 and 9, and illustrating one manner of interconnecting a plurality of systems according to the invention to form a storage register circuit, FIG. 12 is a schematic diagram illustrating one manner of operating a device of the present invention as a bistable element, FIG. 13 is a schematic diagram of one form of binary counter using a plurality of devices of the present invention, FIG. 14 is a schematic diagram of one form of a binary adder using a plurality of devices of the present invention, and FIG. 15 is a schematic diagram of a gating circuit useful in the binary adder of FIG. 14.

Referring to FIG. 1, a magnetic system 2 embodying the invention has four magnetic cores 4, 6, 8 and 10 each respectively linked by one of the four windings 12, 14, 16 and 18. The four windings are interconnected in a bridge circuit with each winding comprising one of the arms thereof. The upper left and right arms of the bridge circuit, as viewed in the drawing, are formed by the windings 12 and 14 of the cores 4 and 6, respectively; the lower left and right arms are formed by the windings 16 and 18 of the cores 8 and 10, respectively. An input pulse source 20 is connected across one of the diagonals of the bridge circuit by respectively connecting the input pulse source leads to the diagonal terminals 22 and 24 of the bridge circuit. The input pulse source 20 is preferably a constant-current source. One terminal of each of the windings 12 and 14 is connected to the first diagonal terminal 22; one terminal of each of the windings 16 and 18 is connected to the second diagonal terminal 24. A capacitor 25 is connected across the other diagonal of the bridge circuit by connecting one of its two plates 25*a* to a third diagonal terminal 30 and the other of its plates 25*b* to the fourth diagonal terminal 32 of the bridge circuit. The other terminal of each of the windings 12 and 16 is connected to the third diagonal terminal 30; the other terminal of each of the windings 14 and 18 is connected to the fourth diagonal terminal 32.

A D.C. (direct current) source, for example, a battery 26, is connected in series with a single-pole, single-throw switch 28 across the other diagonal of the bridge circuit including the third and fourth diagonal terminals 30, 32. The positive terminal of the battery 26 is connected to the third terminal 30; the negative terminal of the battery 26 is connected to one of the fixed terminals of the switch 28, and the other fixed terminal of the switch 28 is connected to the fourth terminal 32 of the bridge circuit.

A utilization device 34 and a second D.C. source, such as a battery 36, are each arranged to be connected across the first and second terminals 22, 24. A single-pole, double-throw switch 38 has its movable arm connected to the second diagonal terminal 24. One fixed terminal 40 of the single-pole double-throw switch 38 is connected to one of the two leads of the utilization device 34 and the other fixed terminal 42 of the switch 38 is connected to the negative terminal of the battery 36. The positive terminal of the battery 36 and the other lead of the utilization device 34 are connected in parallel to the first terminal 22 of the bridge circuit.

Each of the magnetic cores 4–10 of the system of FIG. 1 is preferably made from a material characterized by having a substantially rectangular hysteresis loop. Certain ceramic materials such as manganese-magnesium ferrite and certain metallic materials such as molybdenum-permalloy exhibit the preferred substantially rectangular hysteresis characteristic. For convenience of drawing, the conventional magnetic core transformer symbol is used in illustrating the cores. The separate cores of the bridge circuit preferably have the same physical size. The actual physical form that the cores may take in practice may be, for example, toroidal, cup-shaped, ribbon type, bar-type or other shape cores.

The operation of the system of FIG. 1 will be described with the aid of the idealized hysteresis curve 43 of FIG. 2. Each of the four cores 4–10 is normally magnetized in one of two directions arbitrarily designated P and N. The directions P and N are respectively located above and below the abscissa of the curve 43. The remanent magnetizations in the directions P and N are represented respectively by the points 44 and 46 of the curve 43. A magnetizing force (M.M.F.) in excess of a coercive force $+Hc$ is required to change the magnetization of a core from the direction N to the direction P along the right branch of the loop 43; and an M.M.F. in excess of a value $-Hc$ is required to change a core from the direction P to the direction N. The two saturated conditions of a core in the respective directions P and N are represented by the points 48 and 50 of the curve 43. A relatively large flux change is produced in a core when its magnetization is changed from one direction to the other; and a relatively small flux change is produced in a core when it is driven from remanence in one direction to saturation in the same one direction.

Assume, for the moment, that the system is in its reset condition. Briefly, the reset condition is established by applying the battery 36 voltage for a suitable time across the first and second terminals 22 and 24. Further details of the reset operation are described later on in the description of the system operation. The solid arrows 51*a*–51*d* adjacent the windings 12–18 indicate the direction of the reset current flow in these windings. The current pattern for the reset current and each subsequent input pulse applied during the reset condition is indicated by the arrows 51*a*–51*d* of the symbolic diagram of FIG. 1*a*. A current flow in the direction of an arrow will produce little or no flux change in the core linked by the winding receiving the current flow.

Assume, now, that the utilization device 34 is connected in parallel with the bridge circuit 2 by connecting the movable arm of the switch 38 to its fixed contact 40. Activation of the input pulse source 20 causes an input pulse 55 to flow into the first terminal 22 in the direction of the arrow 56. The input pulse 55 flows from the first terminal 22 to the second terminal 24 via the windings 12 and 16 of the cores 4 and 8 and via the windings 14 and 18 of the cores 6 and 10. The direction of the input current flow in the windings 12–18 is the same as that of the reset current. Therefore, the magnetizing force produced by the input current flowing in each of the windings tends to magnetize the corresponding core in the direction in which it is already magnetized. Accordingly, little flux change is produced and the impedance of the bridge circuit between the first and second diagonal terminals 22 and 24 is extremely low. The bridge circuit essentially provides a short-circuited path for the input signal energy. Very little energy is supplied to the utilization device 34. In the reset condition an indefinite number of input pulses 55 can be applied without changing the magnetization of the bridge circuit cores. The cores 4–10 remain in the initial magnetized condition because, when driven from remanence in one direction toward saturation in the same direction, the respective cores return to substantially the initial remanent condition after the input signal is terminated.

Thus, in the reset condition substantially all the input signal energy is bypassed from the utilization device 34 by the bridge circuit. Note that the input pulses 55 do not charge the capacitor 25, because no net voltage difference appears across the plates 25*a*, 25*b* thereof. The net voltage across the capacitor plates is substantially zero because the impedances of the windings are low and substantially the same, and the bridge is in balance.

The system can be changed from the reset to the set condition by applying a setting signal across the other diagonal of the bridge circuit. By momentarily closing, then opening, the single-pole, single-throw switch 28, the battery 26 voltage is applied across the third and fourth terminal 30, 32. The input pulse source 20 can be considered open-circuited at this time. Also the arm of the single-throw, double-pole switch 38 can be returned to its neutral position, thereby disconnecting the utilization device 34 and the battery 36 from the bridge circuit. When the single-throw switch 28 is operated, a setting pulse 58 flows into the third terminal 30, in the direction of the arrow 59. The setting current flows from the third terminal 30 to the fourth terminal 32 via the windings 12 and 14 of the cores 4 and 6, and via the windings 16 and 18 of the cores 8 and 10. The direction of the setting current in the various windings is indicated by the dotted arrows 52*a* and 52*b* adjacent the windings 12 and 18, and by the solid arrows 51*b* and 51*c* adjacent the windings 14 and 16, respectively.

The arrows of the symbolical diagram of FIG. 1*b* indicate the current pattern for the setting current and each subsequent odd numbered input pulse applied during the set condition. Observe that the setting current is in the opposite direction from that of the reset current in the windings 12 and 18 and operates to change the direction of magnetization of the cores 4 and 10 from that established by the reset current. The cores 6 and 8 remain magnetized in the reset direction. The setting current may charge the capacitor 25, however, the capacitor 25 will subsequently discharge causing a current which flows in the windings in the same direction as that of the setting current.

Assume now that the utilization device 34 is connected across the bridge circuit by operating the single-pole, double-throw switch 38 to connect its movable arm to the fixed contact 40. Upon activation of the input pulse source 20, the bridge circuit offers a relatively high impedance shunt path to the input pulse 55. The input current flows from the first terminal 22 of the bridge circuit to the second terminal 24 via the winding 14 of the core 6, the capacitor 25, and the winding 16 of the core 8. The latter two windings themselves still offer a relatively low impedance to the input current because little flux change is produced in the cores 6 and 8 when they are driven from remanence in one direction to saturation in the same direction. The capacitor 25, however, does offer a high impedance to the input pulse after the initial surge of current. The windings 12 and 18 of the cores 4 and 10 offer a relatively high impedance to the input current because the input current in these windings tends to change the direction of magnetization of their linked cores 4 and 10. Therefore, the bridge is unbalanced and the input current charges the capacitor 25 making the plate 25*b* more positive relative to the plate 25*a*. The charge of the capacitor, and consequently the voltage across its plates, continues to increase during the application of the input pulse 55. The capacitor voltage is applied across the windings 12 and 18 of the cores 4 and 10 and is in a direction to aid the input current in reversing the direction of magnetization of each of these cores.

By the time the input pulse 55 terminates, the direction of magnetization of the cores 4 and 10 is reversed. The capacitor 25 then begins to discharge. The discharge current flows from the capacitor plate 25*b* via the windings 14 and 12 of the cores 6 and 4 and via the windings 18 and 16 of the cores 10 and 8 back to the plate 25*a*. The direction of the discharge current flow in the windings 14 and 16 of the cores 6 and 8 is indicated by the dotted arrows 53*c* and 53*b* adjacent these windings. The direction of the discharge current flow in the windings 12 and 18 of the cores 4 and 10 is indicated by the solid arrows 51*a* and 51*d* adjacent these windings. The discharge current of the capacitor 25 reverses the direction of magnetization of the cores 6 and 8. The solid arrows 51*a* and 51*d* and the dotted arrows 53*b* and 53*c* of the symbolical diagram of FIG. 1*c* indicate the pattern of current flow in the various windings for each subsequent even-numbered input pulse applied during the set condition.

Application of a second input pulse 55 to the bridge circuit operates to charge the capacitor 25 via the windings 12 and 18 of the cores 4 and 10. However, the second input pulse makes the plate 25*a* of the capacitor positive relative to the plate 25*b*. Therefore, the charge voltage of the capacitor now operates to reverse the direction of magnetization of the cores 6 and 8; and the discharge current of the capacitor 25 now reverses the direction of magnetization of the cores 4 and 10. The pattern of current flow in the various windings for the third input pulse is indicated by the arrows in the symbolical diagram of FIG. 1*b* which is the same pattern as that established by the setting current.

Relatively little of the input pulse energy is required to reverse the directions of magnetization of the cores. Thus, in the set condition, most of the input signal energy is delivered to the utilization device 34. A train of input pulses applied to the bridge circuit produces a corresponding train of output pulses for the single setting pulse. The magnetic system "remembers" the setting signal until a new reset signal is applied. If the setting and reset signals are considered as information signals, then the system can be said to store the information.

The output signal applied to the utilization device 34 has the same waveform even though the plates 25*a* and 25*b* of the capacitor are alternately made positive by succeeding input pulses. Due to the symmetrical configuration of the bridge circuit, the more positive plate of the capacitor 25 is connected to the first terminal 22 via a low impedance winding (essentially a zero resistance) each time the direction of magnetization of the one or the other of the pair of cores 4 and 10 or 6 and 8 is changed by the input signal. Repeated interrogation of the stored information is furnished without destruction thereof.

The output voltage waveform does depend somewhat upon the duration of the applied input pulses. Waveforms taken for input pulses having durations equal to, less than, and greater than the time "T" required to change the direction of magnetization of a core are shown in FIGS. 3, 4 and 5, respectively. The waveforms of FIGS. 3–5 include output voltage waveforms and voltage waveforms across the windings 16 and 18 corresponding to the input pulses. These waveforms are somewhat idealized, and are fairly typical, although the waveforms are subject to wide variation with different values of circuit constants. The waveform 67 of FIG. 3 includes a first and a second input current pulse 55 each having an amplitude I and a duration "T" substantially equal to the time required to reverse the direction of magnetization of one of the equal cores 4 and 6 of the bridge circuit. The waveform 68 represents the output voltage 70 produced across the first and second terminals 22, 24 of the bridge circuit by a corresponding input pulse. The positive portion 70*a* of the output voltage 70 rises in a nearly linear fashion from zero voltage at the initiation of the first input pulse 55 to a maximum positive voltage at the termination of the first input pulse. The portion 70*a* represents the voltage due to the charging curent which flows through the winding 14 of the core 6 and into the plate 25*b* of the capacitor 25 at a uniform rate. During the charging of the capacitor 25, the cores 4 and 10 of the bridge circuit have their directions of magnetization reversed. Upon termination of the first input pulse 55, the output voltage reverses in polarity. The negative linear portion 70*b* of the output voltage 70 results from the discharging of the capacitor 25 at a uniform rate while the directions of magnetization of the cores 6 and 8 are being reversed. The impedance of the windings 14 and 16 of the cores 6 and 8 is relatively high due to the relatively large flux changes produced by the discharge current. The second negative portion 70*c* of the output voltage 70 indicates the rapid discharge of the capacitor 25 subsequent to the reversal in magnetization of the cores 6 and 8. The windings 14 and 16 exhibit a low impedance once the directions of magnetization of the cores 6 and 8 linked thereby are changed.

The output voltage 70 produced by the second input pulse 55 has substantially the same waveform as that for the first input pulse 55. The positive portion 70*a* of the second output voltage results from the charging current that flows into the plate 25*a* of the capacitor 25 via the winding 12 of the core 4. The first and second negative portions 70*b* and 70*c* of the second output voltage waveform 70 results from the reversal of the directions of magnetization of the cores 4 and 10 back to their initial directions by the discharge current of the capacitor 25. The nearly linear portion 70*b* occurs during and the exponential portion 70*c* occurs after the directions of magnetization of the cores 4 and 10 are reversed.

The voltages developed across the winding 12 of the core 4 corresponding to the first two input pulses 55 are indicated in the waveform 71 of FIG. 5. The voltages developed across the winding 18 of the core 10 would be substantially the same as those of the waveform 71 and are not shown. During the first input pulse 55, the voltage developed across the capacitor 25 is applied across the terminals of the winding 12 of the core 4; this voltage rises in a nearly linear fashion to some maximum positive voltage, as indicated by the positive slope 72 of the waveform 71. Upon completion of the reversal of the magnetization of the core 4 the voltage across its winding 12 decreases rapidly to a substantially zero amplitude because of the almost negligible impedance of the winding 12 during the discharge current flow. The voltage across the winding 12 continues at zero amplitude until after the termination of the second input pulse 55. At this time the winding 12 offers a high impedance to the discharge current of the capacitor 25 because the discharge current now is in a direction to reverse the magnetization of the core 4. Therefore, a negative voltage pulse 73 appears across the winding 12 upon the termination of the second input pulse 55. The negative voltage pulse 73 first increases in a linear fashion towards zero amplitude as indicated by the linear portion 73*a*, and then increases in an exponential fashion to zero value as indicated by the exponential portion 73*b*. The linear portion 73*a* occurs during the reversal of magnetization of the core 4 and the exponential portion occurs after its reversal is completed. The voltages 72 and 73 repeat alternately for succeeding input pulses 55.

The waveform 75 of FIG. 3 is taken across the terminals of the winding 14 of the core 6 for the first two input pulses 55. The voltage waveform across the terminals of the winding 16 of the core 8 is substantially the same and is not shown. The negative pulse 76 of the waveform 75 begins at the termination of the first input pulse 55 and results from the discharge of the capacitor 25 through the winding 12 of the core 6. The discharge current reverses the direction of magnetization of the core 6. The linear portion 76*a* and the exponential portion 76*b* respectively of the negative pulse 76 occur during and after the reversal in magnetization of the core 6. The positive pulse 77 of the waveform 75 occurs during the application of the second input pulse 55 which charges the capacitor 25 so as to make its plate 25*a* more positive. The negative and positive pulses 76 and 77 of the waveform 75 alternately repeat for successive input pulses 55.

The output waveform 68 is a composite of the waveforms 71 and 75 produced by the charging and discharging of the capacitor 25 through the various windings of the bridge circuit cores 4–10.

The waveform 79 of FIG. 4 represents the application of a first and second input pulse 55′ each having a duration $t_1$ which is less than the switching time T of the bridge circuit cores. The resulting output voltage waveform and the voltage waveform developed across the winding 12 of the core 4 are shown by the waveforms 80 and 83, respectively, of FIG. 4. The amplitude I of the shorter duration input pulses 55′ is the same as that for the input pulses 55 of FIG. 3.

The two output voltage pulses 81, each corresponding to one of the input pulses 55′ of the waveform 80, are similar. The first positive portion 81*a* of an output pulse 80 rises uniformly towards a maximum value during the presence of the first input pulse 55′. The maximum positive value reached by the output voltage pulse 81 is less than that for the output voltage pulse 70 of FIG. 3 due to the lesser charge stored in the capacitor 25. Upon termination of the first input pulse 55′, the capacitor 25 begins discharging via the windings 14 and 12 of the cores 6 and 4 and via the windings 18 and 16 of the cores 10 and 8. Because of the shorter duration of the first input pulse 55′, the cores 4 and 10 are not completely reversed by the time the first input pulse 55′ is terminated. Therefore, the discharge current of the capacitor not only reverses the magnetization of the cores 6 and 8, as for an equal duration input pulse, but also completes the reversal of magnetization of the cores 4 and 10. The voltages developed across the windings 14 and 18 of the cores 6 and 10 are substantially equal in amplitude and of opposite polarities until the core 10 is completely reversed. Similar equal amplitude and opposite polarity voltages are developed across the windings 12 and 16 of the cores 4 and 8 until the core 4 is completely reversed. Thus, the portion 81*b* of the output voltage 81 is of substantially zero amplitude between the times $t_1$ and T. At the time T the direction of magnetization of the core 4 is completely reversed and the output voltage 81 goes negative. The negative linear portion 81*c* of the output voltage represents the linear discharge of the capacitor 25 during the reversal of the core 4; and the negative exponential portion 81*d* represents the discharge of the capacitor 25 after the direction of magnetization of the core 4 is reversed. The output voltage 81 for the second input pulse 55′ is substantially the same as that for the first input pulse 55′.

The waveform 83 of FIG. 4 represents the voltage pulses 84 and 85 developed across the winding 12 of the core 4 corresponding to the first and second input pulses 55′. The voltage pulses developed across the winding 18 of the core 10 are substantially the same and are not shown. During the first input pulse 55′, there is a linear rise in the voltage across the winding 12 as indicated by the positive portion 84*a*. The linear portion 84*a* results from the voltage "built-up" on the capacitor 25 during the first input pulse 55′. Upon termination of the first input pulse 55′, the voltage across the winding 12 drops to a lower positive value and continues at this lower value until the magnetization of the core 4 is completed by the discharge current of the capacitor 25. The lower value of the positive voltage is represented by the flat portion 84*b* of the pulse 84. When the reversal of the magnetization of the core 4 is completed, the voltage thereacross returns to a substantially zero value.

The voltage across the winding 12 continues at zero value until after the termination of the second input pulse 55′. Then a negative voltage pulse 85 is produced. The negative pulse 85 has three portions 85*a*, 85*b* and 85*c*. The portion 85*a* represents a constant voltage across the winding 12 while the capacitor discharge current is completing the reversal in the magnetization of the core 6 via the series circuit of the windings 14 and 12 of the cores 6 and 4. The linear rising portion 85*b* represents the voltage developed across the winding 12 during the reversal of the core 4. The exponential portion 85*c* represents the exponential discharge of the capacitor 25 upon the completion of the reversal of the core 4. The voltage pulses 84 and 85 developed across the terminals of the winding 12 repeat for each pair of shorter duration input pulses 55′.

The voltage pulses developed across the winding 16 of the core 8 are not shown but can be obtained by subtracting the winding 12 voltage waveform 83 from the output voltage waveform 80. That is, for the winding 16, the negative pulse 85 corresponds to the first input pulse 55′ and the positive pulse 84 corresponds to the second input pulse 55′. The voltage pulses developed across the winding 14 of the core 6 also are not shown but are substantially the same as those for the winding 16.

In FIG. 5 are shown voltage waveforms resulting from first and second input pulses 55″ each having an amplitude I and a duration $t_2$. The duration of the input pulses 55″ is somewhat greater than the time "T" required to reverse the direction of magnetization of a bridge circuit core. The waveform 87 includes the first and second larger duration input pulses 55″. The voltage waveform 89 represents the output voltages corresponding to a first and a second longer duration input pulse 55″. Each output voltage pulse 90 has four portions 90*a*–90*d*. The positive linear portion 90*a* results from the charging of the capacitor 25 during the reversal in magnetization of the cores 4 and 10. After the time "T" the output voltage drops to some negative value. The second portion 90*b* of the output voltage pulse occurs between the times "T" and $t_2$. The portion 90*b* is linear and has a relatively fast rise time indicating that the input current from the input source aids the discharge of the capacitor 25. Specifically, the input current opposes the discharge current flow in the windings 14 and 16 of the cores 6 and 8 and aids the discharge current in the windings 12 and 18 of the cores 4 and 10.

Thus, a longer duration pulse acts to speed the discharge of the capacitor 25 and to retard the reversal in the direction of magnetization of the cores 6 and 8. By maintaining the input current for a sufficiently long time, the capacitor 25 is discharged without reversing the magnetization of the cores 6 and 8. The directions of magnetization of the respective cores 4–10 then correspond to the reset condition. Thus the bridge circuit is changed from the set to the reset condition by connecting the movable arm of the double-pole switch 38 to the second fixed terminal 42 thereof. The battery 36 is thus connected across the first and second terminals 22, 24 of the bridge circuit. The single-pole, double-throw switch 38 is left closed for the time required to complete the discharge of the capacitor 25, then the switch 38 is opened. The minimum length required for the reset pulse can be ascertained with sufficient accuracy for practical purposes by extrapolating the first negative portion 90*b* of the waveform 89 (FIG. 5) until it intersects the abscissa of the waveform 89.

The second negative portion 90*c* of the output pulse 90 begins at the termination of the first longer duration pulse 55″. The second negative portion is linear and has a slope relatively less than that of the first negative portion 90*b*. The lesser slope indicates the uniform discharge of the capacitor 25 via the windings 14 and 12 of the cores 6 and 4 and the windings 18 and 16 of the cores 10 and 8. The discharge current reverses the direction of magnetization of the cores 6 and 8. The third negative portion 90*c* of the output pulse 90 is exponential and indicates the rapid discharge of the capacitor 25 upon the reversal of the directions of magnetization of the cores 6 and 8. The second output pulse 90 corresponding to the second input pulse 55″ is similar to the first output pulse 90.

The output voltage waveform 92 of FIG. 5 represents the output voltages across the winding 12 of the core 4 corresponding to the first and second input pulses 55″. The first input pulse 55″ reverses the direction of magnetization of the core 4 during the uniform charging of the capacitor 25. The positive voltage pulse 93 of the waveform 92 has a linear slope which increases from zero value to some maximum value and then drops to a substantially zero value at the time "T" when the direction of magnetization of the core 4 is reversed.

The voltage across the winding 12 of the core 4 remains at the zero value until the second input pulse 55″ completes the reversal of the core 6. At this time, the voltage across the winding 12 goes negative. The first negative portion 94*a* of the pulse 94 is linear and has a relatively high slope and occurs after the reversal of the core 6 when the capacitor 25 is rapidly discharging. The second negative portion 94*b* of the pulse 94 is also linear and has a relatively low slope relative to the slope 94*a* and occurs during the reversal of the core 4 by the discharge current of the capacitor 25. The third exponential portion 94*c* of the pulse 94 occurs after the direction of magnetization of the core 4 is reversed. The two pulses 93 and 94 alternately repeat for each two successive longer input pulses 55″. The voltage waveform across the winding 18 of the core 10 is substantially the same as the waveform 92, and is not shown. The voltage waveform across the winding 16 of the core 8 is not shown, but can be readily obtained by subtracting the winding 12 voltage waveform 92 from the output voltage waveform 89. The voltage waveform across the winding 14 of the core 6 (also not shown) is substantially the same as that for the winding 16 of the core 8.

In the embodiment of FIG. 6, a bridge circuit has only two cores, each replacing a pair of cores of the embodiment of FIG. 1. A first core 100 serves the function of the cores 4 and 10 of FIG. 1, and a second core 102 serves the function of the cores 6 and 8 of FIG. 1. The four windings 12–18 are interconnected in a bridge circuit as described for the circuit of FIG. 1. The windings 12 and 18 are linked to the first core 100 and the windings 14 and 16 linked to the second core 102. The sense of linkage of a winding to a core is indicated in the conventional transformer manner by placing a dot adjacent one of the winding terminals. It is assumed that any flux change produced by a current entering a core winding at the dot-marked terminal thereof induces an E.M.F. in the core windings so as to make the dot-marked winding terminals positive relative to the respective unmarked terminals.

The input pulse source 20 and the utilization device 34 may be connected across the first and second diagonal terminals 22 and 24 of the bridge circuit. The circuit between the second terminal 24 of the bridge circuit and each of the input pulse source 20 and the utilization device 34 may be completed through a reference source, indicated in the drawing by the conventional ground symbol. The capacitor 25 is connected between the third and fourth diagonal terminals 30 and 32 of the bridge circuit.

Reset pulses 120 are applied across the first and second diagonal terminals 22 and 24 of the bridge circuit by means of a linear transformer 104. The terminals of the primary winding 105 of the transformer 104 are connected to a reset pulse source 106. The secondary winding 107 of the transformer 104 has its marked terminal connected to the first terminal 22 of the bridge circuit. The unmarked terminal of the secondary winding 107 is connected to a unilateral conducting device, such as a diode 108. The cathode of the diode 108 is connected to the unmarked terminal of the secondary winding 107, and the anode of the diode 108 is connected to the negative terminal of a bias source V arranged to bias the diode 108 to its cut-off condition. The positive terminal of the bias source V is connected to ground.

Setting pulses 125 are applied to the bridge circuit windings by means of a second linear transformer 110. The terminals of the primary winding 112 of the second transformer 110 are connected to a setting pulse source 114. The second transformer 110 has a first secondary winding 115 and a second secondary winding 116. The unmarked terminal of the first secondary winding 115 is connected to the fourth terminal 32 of the bridge circuit, and the marked terminal of the second secondary winding 116 is connected to the third terminal 30 of the bridge circuit. Second and third unilateral conducting devices, such as the diodes 118 and 119, are respectively connected in series with one of the secondary windings 115 and 116 of the transformer 110. The second diode 118 has its anode connected to the marked terminal of the secondary winding 115 and its cathode connected to the positive terminal of a second bias source $V_1$; the negative terminal of the second bias source $V_1$ is connected to ground. The third diode 119 has its cathode connected to the unmarked terminal of the second secondary winding 116 and its anode connected to the negative terminal of a third bias source $V_2$; the positive terminal of the third bias source $V_2$ is connected to ground. The second and third bias sources $V_1$ and $V_2$ operate to maintain the secondary circuits of the second transformer 110 open except when a setting pulse is applied to the primary winding 112. The setting pulse source 114 and the reset pulse source 106 are preferably constant-current sources.

The operation of the two-core circuit of FIG. 6 is in many respects similar to that described for the four-core circuit of FIG. 1. The system of FIG. 6 is reset by activating the reset pulse source 106 to apply a reset pulse 120, in a direction of the arrow 121, to the primary winding 105 of the first transformer 104. The voltage induced in the secondary winding 107 of the transformer 104 causes a current to flow into the first terminal 22 of the bridge circuit. The reset current flows into the marked terminals of the windings 12 and 18 of the core 100 and into the marked terminals of the windings 14 and 16 of the core 102. The reset current is maintained for a sufficiently long time so that the cores 100 and 102 are fully magnetized in one direction, for example, the direction P. Each of the windings of the bridge circuit then offers a relatively low impedance to the input pulses 55, and substantially no input energy is delivered to the utilization device 34. The solid arrows 122 and 123 respectively adjacent the cores 100 and 102 are used to indicate the direction of magnetizations of the cores in the reset condition.

The circuit can be changed to its set condition by activating the setting pulse source 114 to apply a setting pulse 125, in the direction of the arrow 126, to the primary winding 112 of the second transformer 110. The setting pulse 125 induces a current in each of the secondary windings 115 and 116. These secondary currents flow into the unmarked terminal of the windings 12 and 18 of the core 100 changing its direction of magnetization from the direction P to the direction N. The secondary current flowing in the windings 14 and 16 of the core 102 are in a direction to maintain this core magnetized in a direction P. The directions of magnetization of the cores 100 and 102 in the set condition are indicated by the dotted arrows 128 and 129 respectively adjacent these cores. The setting pulse 125 may charge the capacitor 25. However, the discharge current of the capacitor 25 flows in the various windings 12–18 in the same direction as the current caused by the setting pulse, and the directions of magnetization of the cores 100 and 102 are unchanged.

The bridge circuit winding pairs 12 and 18 and 14 and 16 now offer a high impedance path to alternate ones of the input pulses 55, and substantially all the input pulse energy is delivered to the utilization device 34. The first input pulse 55 supplied in the set condition changes the core 100 from the direction N to the direction P and charges the capacitor 25. The discharge current of the capacitor 25 then flows through the windings 14 and 16 of the core 102 and reverses this core to the direction N. A second input pulse 56 then reverses the core 102 back to the direction P and charges the capacitor 25; the discharge current of the capacitor 25 then changes the core 100 from the direction P to the direction N. The one and then the other of the cores 100 and 102 are alternately reversed in a similar fashion by succeeding input pulses 55. The circuit can be changed back to the reset condition by applying a new reset pulse 120 to the first transformer 104 primary winding 105. The input pulses 55 are of approximately the same duration as the setting pulses 125 and the reset pulses 120 have a duration longer than the input and the setting pulses.

In one specific illustrative embodiment of the two-core circuit of FIG. 6, each of the cores 100 and 102 were made from 15 wraps of ⅛ mil. molybdenum-Permalloy tape wound on a ⅜ inch diameter bobbin. Sixty turns were used for each of the windings 12–18. The capacitor 25 had a rating of 3600 micro-micro farads. The input pulses 55 were varied between 0.4 and 2 microseconds in duration and between 100 milliamperes and 30 milliamperes in amplitude. The input pulses had rise and fall times in the order of 0.1 microsecond and had a flat top. Setting pulses 125 similar to the input pulses 55 were applied across the third and fourth terminals 30 and 32 of the bridge circuit. Reset pulses 120 of approximately 5 microseconds duration and 30 milliamperes amplitude were applied across the first and second terminals 22 and 24 of the bridge circuit. The impedance of the utilization device was varied as low as 50 ohms. The output voltage waveform for the shorter duration input pulses resembled those of FIG. 4; and the output voltage waveform for the longer duration input pulses resembled those of FIG. 5. The switching time for the cores 100 and 102 was varied from 0.5 to 2.0 microseconds by changing the amplitude of the supply pulses. By varying the amplitude and the duration of the supply pulses, in the above ranges, output waveforms resembling those of FIGS. 3, 4 and 5 were obtained.

The various pulse sources and the utilization device can be coupled to the individual cores by means of separate windings. For example, in the arrangement of FIG. 7, a two-core circuit has separate first and second setting windings 130 and 131, separate first and second input windings 133 and 134, and separate first and second output windings 136 and 137 where each first winding is linked to the first core 100 and each second winding is linked to the second core 102. The first and second setting windings 130 and 131 are connected in series-opposition relation by connecting the marked terminal of the first setting winding 130 to the marked terminal of the second setting winding 131. The unmarked terminal of the first setting winding 130 and the unmarked terminal of the second setting winding 131 are each connected to one of the two terminals of the setting pulse source 114. The first and second input windings 133 and 134 are connected in series-aiding relation by connecting the unmarked terminal of the first input winding 133 to the marked terminal of the second input winding 134. The marked terminal of the first input winding 133 and the unmarked terminal of the second input winding 134 are each connected to one of the two terminals of the input pulse source 20. The first and second output windings 136 and 137 are connected in series-aiding relation by connecting the marked terminal of the first output winding 136 to the unmarked terminal of the second output winding 137. The unmarked terminal of the first output winding 136 and the marked terminal of the second output winding 137 are each connected to one of the two terminals of the utilization device 34. Reset pulses may be conveniently applied to the bridge circuit by using the first and second input windings 133 and 134. The two output terminals of the reset pulse source 106 are connected respectively to the one and the other of the two leads connecting the input pulse source 20 and the first and second input windings 133 and 134. If desired, separate first and second reset windings (not shown) may be used for applying the reset pulses. However, the arrangement of FIG. 7 provides one way of eliminating two additional reset windings by time-sharing the first and second input windings 133 and 134 between the input pulse source 20 and the reset pulse source 106.

The operation of the arrangement of FIG. 7 is similar to that described for the arrangement of FIG. 6. Thus in the set condition, the direction of the magnetization of the core 100 is changed by a first input pulse 55, and then the direction of magnetization of the core 102 is changed due to the discharge current of the capacitor 25. The following input pulse then changes the direction of magnetization of the core 102, and the discharge current of the capacitor then operates to change the direction of magnetization of the core 100, and so on for succeeding input pulses. Each time the direction of magnetization of a core is changed, an output voltage is induced in the output winding coupled thereto, and a signal is supplied to the utilization device 34.

In the reset condition, the input pulses 55 do not change the direction of magnetization of either one of the cores 100 and 102. Consequently, there is substantially no voltage induced in the first and second output windings 136 and 137, and substantially no signal is applied to the utilization device 34. The circuit is placed in a reset condition by applying a reset pulse 120 to the first and second input windings 133 and 134 in the direction of the arrow 121. The reset current flows into the marked terminal of the first input winding 133 and into the marked terminal of the second input winding 134. Upon the termination of the reset pulse 120, the cores 100 and 102 are magnetized in the one direction, for example, the direction P. The input pulse source 30, the setting pulse source 114, and the utilization device 34 may be open-circuited when the reset pulse 120 is applied. Application of an input pulse 55 then drives the cores 100 and 102 further into saturation in the direction P. Accordingly, little flux change is produced in the first and second cores 100 and 102 and substantially no output voltage is induced in the first and second output windings 136 and 137. The reset pulse source 106 and the setting pulse source 114 may be open-circuited when input pulses 55 are applied.

The circuit is changed from its reset to its set condition by applying setting pulses 125, in the direction of the arrow 126, to the first and second setting windings 130 and 131. The setting current flows into the unmarked terminal of the first setting winding 130, and the marked terminal of the second setting winding 131. Therefore the first core 100 is changed from the direction P to the direction N of magnetization and the second core 102 remains magnetized in the direction P. The input pulse source 20, the reset pulse source 106 and the utilization device 34 may be open-circuited when a setting pulse is applied. The first input pulse 55 applied in the set condition reverses the direction of magnetization of the first core 100 from the direction N to the direction P. A voltage is induced in the bridge circuit windings 12 and 18 of the first core 100 and in the first output winding 136. The voltage induced in the windings 12 and 18 of the bridge circuit make their marked terminals more positive relative to their unmarked terminals and a circulating current flows in the bridge circuit windings. The circulating current charges the capacitor 25 making its plate 25_b_ more positive than its plate 25_a_. Upon termination of the first input pulse, the discharge current of the capacitor 25 flows into the unmarked terminals of the windings 14 and 16 of the core 102 reversing its direction of magnetization to the direction N. A voltage is then induced in the second output winding 137 linked to the second core 102. Succeeding input pulses 55 reverse the direction of magnetization of the one or the other of the first and second cores 100 and 102.

Note that the driving circuits, the bridge circuit windings, and the output windings may be independent one from the other. Accordingly, the voltage levels of these circuits may vary. For example, in the arrangement of FIG. 6, the input pulse source 20, the bridge circuit windings 12–18, and the utilization device 34 are connected to ground; whereas in the arrangement of FIG. 7, each of the circuits is independent. Such an arrangement, in practice, provides advantages in that a common ground or reference source is not required.

A plurality of the devices according to the invention may be arranged in desired fashion for use in information handling systems. A schematic diagram of a multi-input "and" gate circuit is shown in FIG. 10, and one form of a register for storing binary encoded data is shown in FIG. 11. For convenience of drawing, symbolical diagrams of FIGS. 8 and 9 are used in representing the one and the other response conditions of an individual device. The bridge circuit cores, the windings thereof, and the capacitor are collectively represented by a diamond-shaped figure 140. Each of the four corners of the diamond represents one of the four terminals of a bridge circuit. Only the first and second terminals 22 and 24 are indicated. The numeral "1" inscribed in the diamond 140 of FIG. 8 is used to represent one of the response conditions of a bridge circuit, for example, the set response condition. The numeral "0" inscribed in the diamond 140 of FIG. 9 is used to represent the reset reponse condition.

The "and" gate circuit 142 of FIG. 10 has a plurality of the devices arranged in parallel with one another by connecting all the terminals 22 to a first input terminal 144 and a first output terminal 145 of the "and" gate circuit, and by connecting all the bridge circuit second terminals 24 to a second input terminal 146 and a second output terminal 147 of the "and" gate circuit. Only the symbolic representations 140 for the first, second and last bridge circuit arrangements are shown. An input pulse source 149 and a reset pulse source 150 are each connected across the first and second input terminals 144 and 146 of the "and" gate circuit. A utilization device 151 is connected across the first and second output terminals 145 and 147 of the "and" gate circuit 142. Each of the bridge circuits may comprise a two-core bridge circuit having the windings 12–18 interconnected in the manner described for the circuit of FIG. 6, and having separate setting windings 130 and 131 linked to the cores in the manner described for the windings 130 and 131 of FIG. 7. Setting pulses 160 are applied to the individual pairs of setting windings 130 and 131 under the control of a data input device 155. The data input device 155 may be any device adapted to apply setting pulses to desired ones of the setting winding pairs.

In operation, each of the bridge circuits 140 is placed in its reset condition by applying a reset pulse 157 to the input terminal 144 of the "and" gate circuit 142. The data input device 155 is then operated to apply individual setting pulses 160 to separate ones of the setting winding pairs. For example, a setting pulse 160 may be applied to each of the setting winding pairs, thereby placing each of the bridge circuits in its set condition. An input pulse 162 applied to the input terminal 144 of the "and" gate circuit then furnishes a signal to the utilization device 151 because each of the bridge circuits 140 offers a high impedance to the input current. However, if one or more of the bridge circuits 140 is in the reset condition, these one or more bridge circuits 140 would offer a relatively low impedance to the input pulse 162, thereby bypassing the input current from the utilization device 151. Accordingly, an output signal is produced only when all the bridge circuits 140 are in the set condition.

The storage register circuit 165 of FIG. 11 has a plurality, illustratively four, of the bridge circuits 140 connected in series relation by connecting the second terminal 24 of one bridge circuit 140 to the first terminal 22 of the next succeeding bridge circuit 140. An input pulse source 166 and a reset pulse source 168 are connected across the bridge circuits by connecting one of the two terminals of the input and reset pulse sources 166 and 168 to the first terminal 22 of the first bridge circuit 140, and by connecting the other terminals of the pulse sources 166 and 168 to the second terminal 24 of the last bridge circuit 140. Each of the bridge circuits 140 has an individual pair of setting windings 130 and 131 connected to the data input device 155. Each of the bridge circuits 140 may be provided with a separate pair of output windings 136 and 137 each linked to one of the bridge circuit cores in the manner described for the first and second output windings 136 and 137 of FIG. 7.

In operation, a reset pulse 172 is applied across the series-connected bridge circuits 140, thereby resetting each of the individual bridge circuits 140. In the reset condition, application of an input pulse 174 to the series-connected bridge circuits 140 does not induce any appreciable voltage across the terminals of any one of the separate pairs of output windings. Assume, however, that after the reset pulse, setting pulses 175 are applied to the setting winding pairs of the second and third bridge circuits 140. The second and third bridge circuits 140 are thus changed from the reset to the set condition, indicated by the numeral "1", inscribed in the diamond 140 representing these circuits. The first and fourth bridge circuits 140 remain in the reset condition, indicated by the numeral "0" inscribed in the diamond 140 representing these circuits. Now when an input pulse 174 is applied, the output winding pairs coupled to the second and third bridge circuits have an appreciable voltage induced across their terminals. Further, an output signal is furnished by the second and third bridge circuits 140 for each succeeding input pulse 174. The first and fourth bridge circuits 140 do not furnish any output signals.

Each of these bridge circuits provides four different combinations of magnetization directions. In two of these combinations, the cores are all magnetized in the same direction, i.e., all cores magnetized in the direction P, or all in the direction N. In the other two combinations, the cores are magnetized in different directions, i.e., half in N and half in P, or vice versa.

A utilization device, as described above, connected in parallel with the bridge circuit receives a signal when the cores are magnetized in different directions, and does not receive any signal when the cores are magnetized in the same direction. A utilization device connected in series with the bridge circuit does or does not receive a signal in accordance with whether the cores are magnetized in the same or different directions. Thus the response conditions, in so far as the utilization device is concerned, are not absolute, but differ with the manner of connecting the utilization device and the bridge circuit.

In the previously described embodiments, only the magnitude of the output signal was considered. In certain binary devices such as counters and adders, etc., it is advantageous to consider both the magnitude and the polarity of the output signal. One manner of arranging a bridge circuit as a binary device is illustrated by the symbolical diagram of FIG. 12. Two different cores 100 and 102 may be linked by the windings 12–18 in the manner described for the circuit of FIG. 6. A pair of setting windings 130 and 131 are linked to the cores 100 and 102 in the manner described for the setting windings 130 and 131 of FIG. 7.

In operation, the cores 100 and 102 are always magnetized in different directions, N and P or P and N, respectively. One set of these directions is indicated by the solid arrows 180–183 with the arrows 180 and 182 representing, for example, the direction N for the core 100 and the solid arrows 181 and 183 representing the direction P for the core 102. The other set of these directions is indicated by the dotted arrows 185–188 with the arrows 185 and 187 representing the direction P for the core 100 and the arrows 186 and 188 representing the direction N for the core 102. The one and the other of these sets of directions is established by applying a current in the direction of the one and the other of the arrows 190 and 191 to the setting windings 130 and 131. The input pulses from an input pulse source 192 are applied across the first and second diagonal terminals 22 and 24. The output signals may be taken across the second and fourth terminals 24 and 32 and delivered to an output device 194. The output device 194 may be any device responsive to one polarity of voltage pulses, for example, positive pulses induced in the winding 16. The output may be also taken across any two terminals of a winding as, for example, the third and second terminals 30 and 24 as indicated by the lead 195.

The two sets of different directions may correspond respectively to the binary digits "1" and "0". In the case of a binary "1", a positive polarity voltage is furnished to the output device 194 when a first input pulse is applied; and in the case of a binary "0" a negative output voltage is furnished to the output device 194. A second input pulse reverses the polarity of the output in the manner indicated by the waveforms 71 and 75 of FIG. 3.

A plurality of the bridge circuits can be arranged to form a binary counter by applying the positive output of one stage to the input of the next succeeding stage. In FIG. 13, three stages 201, 203 and 205 of a binary counter 200 are shown. The output of each stage is connected to the input of a succeeding stage, via one of the coupling devices 206. Each coupling device 206 may be any known device which furnishes a positive output in response to a positive input and which blocks a negative input. For example, a device 206 may consist of an NPN type transistor having its output connected to the input of a PNP type transistor, where the NPN type input is connected to the output of a preceding counter stage and the output of the PNP type is connected to the input of a succeeding counter stage and where both transistors are normally biased to cut-off. The input to the first stage 201 may be supplied by a preceding stage (not shown) and the output of the third stage 203 may be supplied to a succeeding stage (not shown). A zero count, or any desired initial count may be placed in the counter by supplying suitable pulses to the setting windings 130 and 131 of each stage. A common source of interrogation pulses 210 is connected in parallel with each of the stages 201–203. A unilateral conducting device, such as a diode 212, is used for blocking the input pulses applied to a stage from the interrogation source 210. The outputs $2^0$, $2^1$, and $2^2$ of the counter 200 are taken by way of three leads connected to the outputs of the three coupling devices 206 connected to the stages 201–203, respectively.

The binary operation of the counter 200 is illustrated by the following Table I:

*Table I*

| Stage No. | I | | II | | III | |
|---|---|---|---|---|---|---|
| Pulse No. | State | Output | State | Output | State | Output |
| Reset Counter | 0 | -------- | 0 | -------- | 0 | -------- |
| 1 | 1 | -------- | 0 | -------- | 0 | -------- |
| 2 | 0 | + | 1 | -------- | 0 | -------- |
| 3 | 1 | -------- | 1 | -------- | 0 | -------- |
| 4 | 0 | + | 0 | + | 1 | -------- |
| 5 | 1 | -------- | 0 | -------- | 1 | -------- |
| 6 | 0 | + | 1 | -------- | 1 | -------- |
| 7 | 1 | -------- | 1 | -------- | 1 | -------- |
| 8 | 0 | + | 0 | + | 0 | + |

A positive output (+) is produced when a stage is changed from the "1" to the "0" state. The negative output, produced when a stage is changed from the "0" to the "1" state, is blocked by the succeeding coupling device 206.

The count applied to the input of the counter may consist of a train of one or more pulses. The count set into the counter may be determined by activating the interrogation source 210. The initial interrogation should be delayed for the time required for any output to propagate through the counter from the first to the last stages. The delay between adjacent stages is relatively short compared to the switching time of a stage. The stored count can be repeatedly interrogated by applying pairs of interrogation pulses. A first interrogation pulse of a pair reads out the stored count on the leads $2^0$–$2^2$ and writes the complement of the stored count into the counter. That is, those stages in the "1" state are changed to the "0" state, and vice versa. The second interrogation pulse of a pair recomplements the count and returns the count stored in the counter back to the original count. Any positive output furnished during the recomplementation assists the interrogation pulse in returning a succeeding stage back to the initial state.

The binary adder circuit 215 of FIG. 14 illustratively has three stages 217–221 connected in cascade by means of delay units 222 and coupling devices 206. The delay units may be any known type, for example, a delay line composed of inductances and capacitances; the coupling device 206 may be substantially the same as that of the binary counter of FIG. 13. Reset pulses and separate pulses representing the augend are applied to the separate pairs of setting windings 130—131. The pulses representing the addend are supplied to the separate stages 217–221 by an addend device 223 which may be any known device, for example, a magnetic core register arranged for supplying pulses representing the addend on the leads connecting the addend device 223 and the stages of the adder. The least significant digits $2^0$ of the augend and the addend are supplied to the first stage 217 with successively higher order digits being supplied to successive higher stages. The binary digits representing the sum of the augend and the addend are furnished at the output of the separate coupling devices 206 to a sum device 225 which may be any suitable storage register. The final carry, if any, is furnished at the output of the coupling device 206 connected to the output of the last stage of the adder. The final sum of the two binary numbers is determined by activating the interrogation device 210 to apply an interrogation signal to the various adder stages. The diodes 226 connected in the different leads connecting the addend device 223 and the counter stages 217–221 block the interrogation pulse from the addend device 223. A time sufficient for a carry to ripple from the first to the third stages should be allowed before the interrogation is carried out. This time interval is approximately of the order of the sum of the delay times produced by the delay units 222 plus the sum of the switching times of the various stages 217–221. Each delay unit 222 delays the output of a stage for a time substantially equal to that required for the succeeding stage to change from one state to the other.

The ripple time for a carry can be shortened to approximately a single delay interval by providing a means for bypassing the respective delay units 222 of FIG. 14 when a carry is generated. One such means is provided by a gating circuit, such as the circuit 230 of FIG. 15. In the gating circuit 230 two paths 231 and 232 are provided between the output of each counter stage and the input of a succeeding coupling device 206. One path includes a delay unit 222 and a diode 234, and the other path includes a single diode 235. The diodes 234 and 235 are both poled to pass a positive current and both have their cathodes connected to one input of a two-input "and" gate 236. The other input of the "and" gate 236 is activated by a timing pulse $t_5$. The timing pulse $t_5$ is applied under the control of any suitable synchronizing means at approximately one delay time subsequent to the application of the addend pulses. The timing pulse $t_5$ then enables each of the "and" gates 236, and any outputs produced by a carry pulse from one stage is passed without any appreciable delay to the input of a succeeding stage.

There have been described herein improved magnetic circuits having different response conditions to electrical signals. In one response condition, electric signals applied to the input of a system are blocked from a utilization device connected to the output of the system. In another response condition, the electric signals are transmitted to the utilization device. The systems can be changed from one to the other response condition by applying a single setting impulse. A setting pulse need contain only sufficient energy required for reversing the direction of magnetization of a core. The input signals, however, may contain many times the energy of a setting impulse. Thus, the systems of the present invention may be considered as amplifier devices wherein a single, low-energy setting pulse controls an indefinite number of relatively high-energy input pulses. The one (the blocked) and the other (the unblocked) response conditions of the magnetic circuits may correspond respectively to the two binary digits, for example to "1" and "0." Then, when a binary "1" is stored, a train of output signals corresponding to a train of input signals can be obtained without having to apply any additional settings pulses. On the other hand, when a binary "0" is stored no output signal is furnished for the train of input pulses. Constant-current driving sources are preferred when the utilization device is connected in parallel with the bridge circuit as in FIGS. 1 and 6. The utilization device may be connected in series with the bridge circuit as, for example, connecting the utilization device 34 of FIG. 6 between the second terminal 24 and ground. In such case, constant-voltage driving sources are preferred. Bistable systems according to the present invention may be advantageously interconnected to form logical systems and storage devices useful in handling encoded data.

What is claimed is:

1. A magnetic system comprising a bridge circuit having four arms, four magnetic cores each having two states of appreciable remanence, a separate winding on each of said cores, a different one of said windings being connected in each of said arms, a storage capacitor connected across one of the diagonals of said bridge circuit, and means for applying first and second magnetizing forces to said cores, said first magnetizing force establishing all said cores in one of said two remanent states, and said second magnetizing force establishing a first and second of said cores in said one remanent state and the third and fourth of said cores in the other of said two remanent states.

2. A magnetic system comprising a bridge circuit having four arms, first and second magnetic cores having two states of appreciable remanence, two windings on each of said cores, each arm of said bridge circuit including a different one of said windings, a storage capacitor connected across one of the diagonals of said bridge circuit, and means for applying first and second magnetizing forces to said cores, said first magnetizing force establishing both said first and said second cores in one of said two states of remanence, and said second magnetizing force establishing said first core in said one remanent state and said second core in the other said remanent state.

3. A magnetic system comprising four different magnetic cores, a separate winding on each of said cores having two states of appreciable remanence, a bridge circuit having four arms with a different one of said windings connected in each of said arms, a storage means connected across one of the diagonals of said bridge circuit, means connected across the other diagonal of said bridge circuit for receiving electrical signals to be applied to said circuit, one of said electrical signals applying a first magnetizing force to said cores to establish all said cores in one of two said states of remanence, and another of said electrical signals applying a second magnetizing force to said cores to establish a first and second of said cores in said one remanent state and the third and fourth of said cores in the other of said two remanent states.

4. A magnetic system comprising a bridge circuit having four arms, an even number of magnetic cores, each of said cores being made from a magnetic material characterized by having a substantially rectangular hysteresis loop, each of said cores having two directions of magnetization, four windings divided evenly among and linked to said magnetic cores, each arm of said bridge circuit including one of said windings, storage means connected across one of the diagonals of said bridge circuit, and means for applying first and second magnetizing forces to said cores, said first magnetizing force establishing all said cores in one direction of magnetization, and said second magnetizing force establishing certain ones of said cores in said one direction of magnetization and the remaining ones of said cores in the other of said directions of magnetization.

5. A magnetic system comprising a bridge circuit having four arms, an even number of magnetic cores of substantially rectangular hysteresis loop magnetic material, four windings evenly divided among and linked to said cores with a different one of said four windings connected in each of said bridge circuit arms, storage means connected across one of the diagonals of said bridge circuit, a pair of setting windings each linked to a different one of said cores, means connecting said pair of setting windings in series opposition relation, means for applying a first magnetizing force to said cores to establish all said cores in one direction of magnetization, and means including said pair of setting windings for applying a second magnetizing force to said cores to establish half of said cores in said one direction of magnetization and the remaining ones of said cores in the other direction of magnetization.

6. A magnetic system comprising a bridge circuit having four arms, an even number of magnetic cores of substantially rectangular hysteresis loop magnetic material, four windings evenly divided among and linked to said cores with a different one of said four windings connected in each of said bridge circuit arms, storage means connected across one of the diagonals of said bridge circuit, a setting and an output winding on each of said cores, means connecting a pair of said setting windings in series opposition relation, means connecting said output windings in series aiding relation, means for applying a first magnetizing force to said cores to establish all said cores in one direction of magnetization, and means including said setting windings for establishing certain ones of said cores in said one direction of magnetization and the remaining ones of said cores in the other direction of magnetization.

7. A magnetic system comprising first and second magnetic cores of substantially rectangular hysteresis loop magnetic material, each of said cores having four different windings thereon, a bridge circuit having four arms, said bridge circuit arms respectively including a first and a second winding on said first core and a first and a second winding on said second core, storage means connected across one diagonal of said bridge circuit, a third winding on said first core being connected in series opposition relation to a third winding on said second core, a fourth winding on said first core being connected in series aiding relation with a fourth winding on said second core, means for applying a first magnetizing force to establish all said cores in one direction of magnetization, and means including said third windings for applying a second magnetizing force to said cores to establish said first core in said one direction of magnetization and said second core in the other direction of magnetization.

8. A magnetic system comprising a bridge circuit having four arms, an even number of magnetic cores of substantially rectangular hysteresis loop magnetic material, each of said cores having two directions of magnetization, four windings divided evenly among and linked to said cores, each arm of said bridge circuit including one of said windings, a storage capacitor connected across one of the diagonals of said bridge circuit, means for applying a magnetizing force to said cores to establish half of said cores in one of said directions of magnetization and the other half of said cores in the other of said directions of magnetization, and means for applying input pulses across the other diagonal of said bridge circuit, whereby odd-numbered ones of said input pulses charge said capacitor via a first and a second of said windings and even ones of said input pulses charge said capacitor via a third and a fourth of said windings.

9. A magnetic system comprising a bridge circuit having four arms, an even number of magnetic cores of substantially rectangular hysteresis loop magnetic material, four windings divided evenly among and linked to said cores, each arm of said circuit including a different one of said windings, storage means connected across one of the diagonals of said bridge circuit, and first and second means respectively connected across the one and the other of said diagonals of said bridge circuit for receiving different electrical signals to be applied to said bridge circuit.

10. A magnetic system comprising a bridge circuit having four arms, an even number of magnetic cores of substantially rectangular hysteresis loop magnetic material, each of said cores having two directions of magnetization, four windings divided evenly among and linked to said cores, each arm of said bridge circuit including a different one of said windings, storage means connected across one of said diagonals of said bridge circuit, means connected across the other diagonal of said bridge circuit for establishing all said cores in one direction of magnetization, and means connected across said one diagonal of said bridge circuit for establishing half of said cores in said one direction of magnetization and establishing the other half of said cores in the other direction of magnetization.

References Cited in the file of this patent

UNITED STATES PATENTS

| | | |
|---|---|---|
| 1,544,381 | Elmen et al. | June 30, 1925 |
| 1,745,378 | Osnos | Feb. 4, 1930 |
| 1,802,244 | Fluharty | Apr. 21, 1931 |
| 2,414,317 | Middel | Jan. 14, 1947 |
| 2,632,883 | Richardson | Mar. 24, 1953 |
| 2,723,373 | Steinitz | Nov. 8, 1955 |
| 2,768,312 | Goodale et al. | Oct. 23, 1956 |
| 2,769,122 | Moreines et al. | Oct. 30, 1956 |

OTHER REFERENCES

"High Speed Magnetic Amplifiers," by A. E. Maine, published in "Electronic Engineering," May 1954, pp. 180–185, FIG. 6B specifically relied upon.